United States Patent [19]

Baviera Sabater

[11] Patent Number: 5,044,392
[45] Date of Patent: Sep. 3, 1991

[54] CONDENSATE DRAINAGE DEVICE FOR CLOSED CIRCUIT STEAM INSTALLATIONS

[76] Inventor: Robert Baviera Sabater, Gómez Ferrer, 33, Torrente (Valencia), Spain

[21] Appl. No.: 439,604

[22] Filed: Nov. 20, 1989

[51] Int. Cl.⁵ ............................................. F16T 1/34
[52] U.S. Cl. ..................................... 137/171; 138/42
[58] Field of Search .......................... 138/42; 137/171

[56] References Cited

U.S. PATENT DOCUMENTS 1,087,883  2/1914  Loomis ................................ 138/42
3,346,117 10/1967  Page, Jr. ............................. 138/42

FOREIGN PATENT DOCUMENTS 6788  2/1902  Austria .............................. 137/171

Primary Examiner—Albert W. Davis, Jr.
Attorney, Agent, or Firm—Darby & Darby

[57] ABSTRACT

A drainage apparatus having a spiral conduit housed inside a metal tube. Condensates flow through an inlet of the metal tube and through a chamber between the inside wall of the metal tube and the outside of the spiral tube to enter into the spiral tube. After circulating through the spiral tube, the condensates exit outside of the metal tube itself. A casing is provided that is surrounded radially by the spiral tube. Temperature readings may be taken from within the casing with a thermometer.

9 Claims, 1 Drawing Sheet

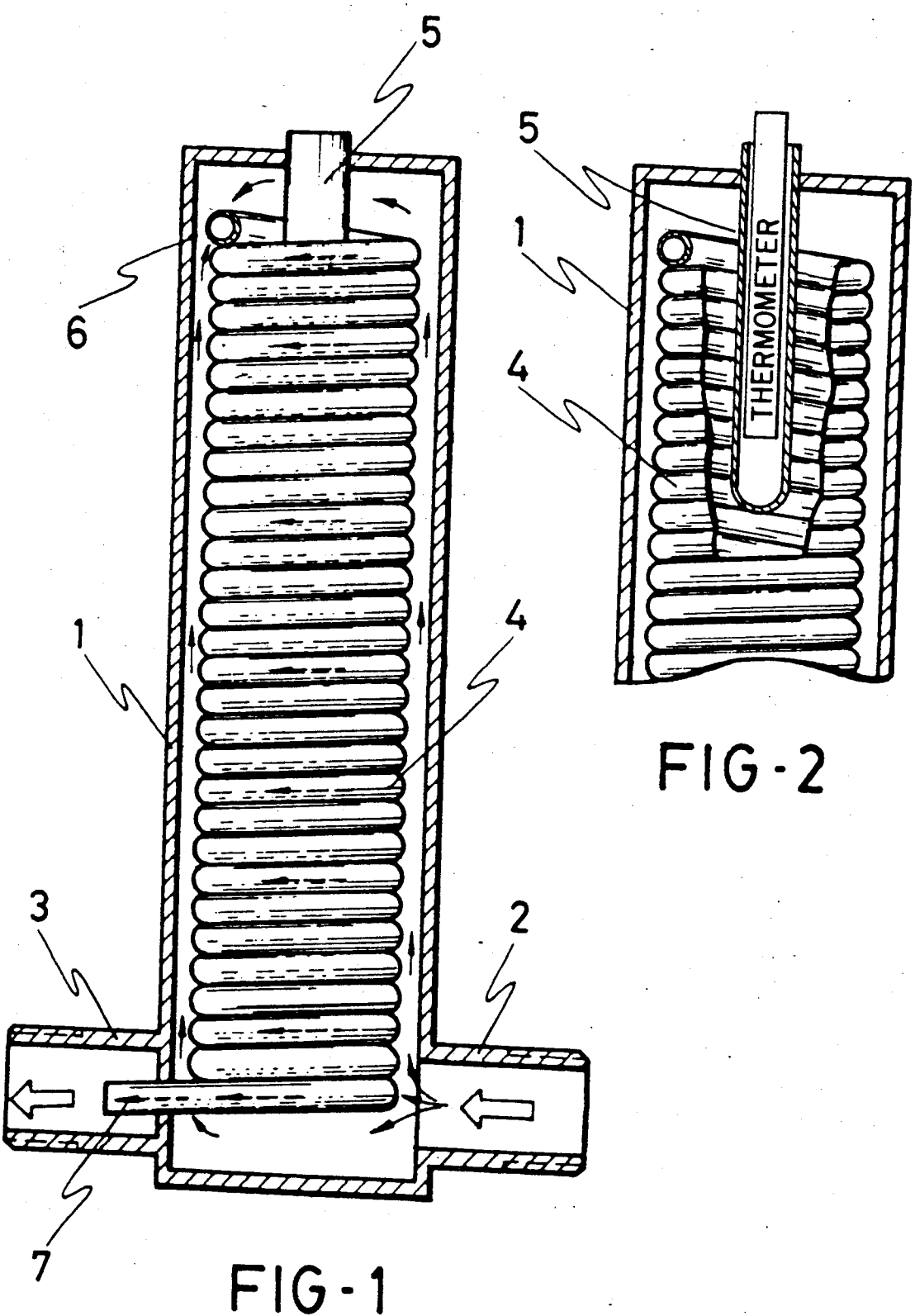

CONDENSATE DRAINAGE DEVICE FOR CLOSED CIRCUIT STEAM INSTALLATIONS

BACKGROUND OF THE INVENTION

The present invention relates to a condensate drainage or purging device applicable to closed circuit steam installations. The device is basically applicable to industries that use steam as a means of indirect heating to heat certain parts of elements of the installation itself.

In certain industries which use steam as an indirect heating method, there is a serious problem when condensates are to be eliminated. Such industries include the types in which the steam gives off its heat through coils, drying cylinders, plates and the like, for instance in corrugated board factories, paper factories and rubber molding machines. In these types of steam installations, even for the closed circuit type, it is necessary to eliminate or drain off the condensates so that the condensation process is continuous and a drop in temperature is avoided.

Presently, drainage takes place by means of the classic draining device, which produces constant steam and pressure losses and a subsequent temperature drop. This causes a high fuel consumption in the water heating boiler itself in order to produce the corresponding steam.

By means of the closed circuit, recovery of the drainage product is attained. However, because of the particular nature of the installations, efficient complete drainage of the entire condensate has not been attained.

SUMMARY OF THE INVENTION

The invention is directed at providing a simple drainage device which operates efficiently and is easy to mount in a steam installation.

In effect, the drainage device is made up of a metal tube, preferably of steel, and is provided with two necks for interlaying thereof in a conduit corresponding to a closed circuit steam installation. One of the necks also determines the entrance of the condensates towards the inside of the tube. The condensates circulate through it and enter a spiral conduit housed axially in the metal tube. The condensates then come out through the opposite end of the spiral conduit and emerge outside the metal tube.

There is an opening in the neck which is opposite the entrance of the one neck, although this neck does not offer communication with the inside of the metal tube itself; rather the wall of the metal tube has a hole through which the end of the spiral conduit emerges and the condensates penetrate the metal tube. The condensates flow through the inside of the metal tube between its side wall and the spiral conduit itself and then accede to this spiral conduit, circulating through it and coming out its end until reaching the outside or coupling neck outside the metal tube.

The spiral conduit is protected, preferably with steel so that wear and tear is not produced in the same. During operation, the spiral conduit is exposed to pressures of the condensates, which are compensated because of the circulation through the outside of the spiral conduit as well as the inside of the spiral conduit.

The condensates, upon circulating through the spiral, which constitutes the inside conduit, acquire a direction of rotation and produce a considerable centrifugal force during the run. Thus, on the occasions in which the condensates are made up exclusively of water, a laminar flow which permits the passage of a large flow will be produced. Likewise, in the starting up of any steam heater, when the fluid is air, this will also rapidly form a laminar flow.

On the other hand, when water is being purged with steam, due to the above-cited centrifugal force and the difference of densities, a swirling and irregular flow which will considerably reduce the flow will be produced. This leads to an increase of purged mass when the mass is richer in liquid water. When water with steam in the form of foam circulates, the purged mass will reduce considerably.

In this way, the water or air is rapidly purged, but leaves a controlled gaseous flow which comes out when the spiral is purging in its normal regime. All of this is done in such a way that the gaseous flow, which is let out along with the condensation water, will avoid the accumulation of incondensable gases which would accumulate if only the liquid water were drained.

The drainage device could be called a "diaphragmatic spiral" and is mainly conceived to operate in closed steam circuits, where all the heat of the same is returned to the boiler. Likewise, it operates as an ideal purging device in classic purging installations at ordinary pressure.

Another characteristic that the device has is the inclusion of a case placed axially and concentrically in the top end section of the spiral conduit. This case accommodates the taking of the temperature of the condensates with a mercury thermometer, with which one can check at all times if the drainage is correct. The drainage is correct if the temperature of the thermometer is one which corresponds to the condensation of steam at working pressure. When the drainage is insufficient, a temperature drop with respect to the one which corresponds to the steam pressure will be observed.

BRIEF DESCRIPTION OF THE DRAWINGS

The features and object of the invention will be understood more easily on the basis of the description that is going to be made hereinafter, with the help of the attached drawings in which the following is shown:

FIG. 1 shows a longitudinal view of the condensate drainage device in accordance with the invention. Shown is a cross-split outside metal tube, with the coupling necks to be interlaid in the corresponding conduit of the steam installation.

FIG. 2 shows a partial longitudinal view of the device represented in FIG. 1, but showing an inside cut of the spiral conduit to show the arrangement of the case by which one manages to take the temperature of the condensates that circulate through the spiral conduit.

DESCRIPTION OF THE PREFERRED EMBODIMENT

FIGS. 1 and 2 show a drainage device applicable to closed circuit steam installations. The device has a metal tube 1 which has an entrance neck 2 and a neck 3. The entrance neck 2 is provided close to one of the ends of the metal tube 1 and constitutes an entrance for the condensates towards the inside of the tube 1 itself. Opposite this entrance neck 2 is the neck 3, which is going to constitute the outlet coupling neck and also the coupling means for the interlaying of this tube 1 in the conduit corresponding to the steam installation. The neck 3 does not communicate with the inside of the tube 1.

Axially, in the inside of the metal tube 1, there is a spiral duct 4 whose top section axially and concentrically includes a case 5 for taking temperatures. The spiral conduit 4 has an inlet 6 in the top part and in communication with the inside of the metal tube 1 itself. The spiral conduit has an outlet 7 emerging outside the tube 1 and which precisely leads to the above-mentioned outlet coupling neck 3.

As one can infer and as it has been put forth throughout the present description, the spiral duct 4 is protected and preferably made out of stainless steel, whose protection is obviously the outside metal tube 1.

The chamber determined between the outside surface of the spiral duct 4 and the inside wall of the tube 1 permits the flow of condensates which enter through the neck 2 before acceding to the inlet 6 of the spiral duct 4. The pressures in the spiral 4 will be compensated because the condensates flow simultaneously inside and outside the spiral conduit.

The case 5 in the top of the device serves to enable taking of the temperature by means of a thermometer, with which the temperature of the condensate may be controlled exactly.

I claim:

1. A condensate drainage arrangement, comprising:
    an elongated tube having inlet and outlet openings and an inner facing side which defines a hollow interior;
    a spiral conduit spiraling axially about a space within said hollow interior and having first and second ends which are open, said first end being in communication with said hollow interior, said spiral conduit extending through said outlet opening of said tube so that said second end opens outside said hollow interior and not in communication with said hollow interior, said spiral conduit having an outer facing side which is spaced from said inner facing side of said tube to define a chamber therebetween for enabling the flow of condensates from said inlet opening through said chamber and into said first end of said spiral conduit, said spiral conduit being hollow for enabling the condensates to flow from said first end through said conduit to discharge out said second end and thereby emerge outside of said elongated tube.

2. An arrangement as in claim 1, wherein said hollow of said spiral tube is in communication with said hollow interior of said elongated tube only at said first end.

3. An arrangement as in claim 1, further comprising:
    a case which extends through said elongated tube and into a portion of said space, said case being hollow and having an end which is open outside of said elongated tube.

4. An arrangement as in claim 3, wherein said case accommodates a thermometer in said hollow of said case.

5. A method for drainage of condensate, comprising the steps of:
    flowing condensate into a hollow interior of an elongated tube via an inlet;
    circulating the condensate through a chamber within the hollow interior and into and through a hollow spiral conduit, the spiral conduit spiraling axially about a space within the hollow interior of the tube, the chamber being defined between and inner facing side of the elongated tube and an outer facing side of the spiral conduit, the spiral conduit having an first end which is open in communication with the hollow interior and through which enters the condensate; and
    discharging the condensate from the spiral conduit through a second end which opens outside of the elongated tube and does not open in communication with the hollow interior of the elongated tube, the spiral conduit extending through an outlet in the elongated tube to terminate at the second end outside of the elongated tube so that the condensate emerges from the spiral conduit outside the elongated tube.

6. A method as in claim 5, wherein the interior of the spiral conduit communicates with the hollow interior of the elongated tube only via the first end of spiral conduit.

7. A method as in claim 5, further comprising the step of taking temperature from within a casing which extends into a portion of the space, the casing being hollow and having an end which opens outside of the elongated tube.

8. A method as in claim 7, wherein the step of taking temperature includes reading temperature from a thermometer situated in the casing.

9. A method as in claim 5, wherein the step of circulating includes circulating the condensate to have laminar flow.

* * * * *